Dec. 20, 1955

R. R. BERUEFFY 2,727,553

VEHICLE ANTI-SKID AND TRACTION DEVICE

Filed May 9, 1952

INVENTOR.
ROBERT R. BERUEFFY
BY

United States Patent Office 2,727,553
Patented Dec. 20, 1955

2,727,553

VEHICLE ANTI-SKID AND TRACTION DEVICE

Robert R. Berueffy, Omaha, Nebr.

Application May 9, 1952, Serial No. 288,524

5 Claims. (Cl. 152—216)

The nature and purpose of the invention

My invention is an anti-skid and traction device designed to accomplish the purpose of conventional types of automobile tire chains but to be more convenient in application to the tire. The conventional type of tire chain, either of the full chain variety or the strap-around chain variety requires considerable effort to apply to the tire, and situations frequently arise where chains are needed for emergencies and the automobile operator is incapable of applying conventional chains, or has no conventional chains with him, or for one reason or another neglects to apply chains. Thus his own safety as well as that of other vehicle operators is endangered.

Because the anti-skid and traction device herein described is carried at all times on the wheel and is convenient and easy to apply to the tire the disadvantages mentioned are avoided and the automobile operator is able to render his car safe on slippery roads without the inconvenience, labor and danger involved in applying conventional chains. Moreover, the device herein described will give longer service than the conventional tire chain since because of its convenience in application to the tire, the operator will not be tempted to use it for long distances where its use is not actually required, as he is with the conventional type of chain.

Description of drawings

The accompanying drawings illustrate the construction and operation of my device.

Figure 2 also shows the slotted block which locks the rotating shaft into desired position.

Description of the device

Figure 1:
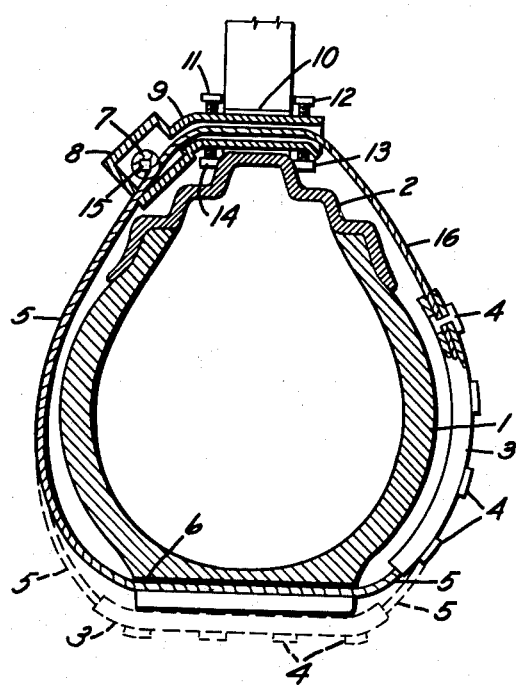
Figure 1 shows in cross section the mounting of the device on an automobile wheel and tire. The solid lines of the drawing in Figure 1 indicate the position of the anti-skid tread when it is carried on the inside of the wheel and tire mounting, not in contact with the road. The dotted lines in Figure 1 indicate the position of the anti-skid tread when it has been moved into position over the normal tire tread and thus comes in contact with the road.

Reference is made to Figure 1, which illustrates the construction of the device and the manner in which it is mounted on an automobile wheel.

Tire 1 is mounted in conventional manner on rim 2. The movable anti-skid tread 3 consisting of a strap of rubber, plastic, metal or other durable material is carried at the side of tire 1 when its contact with the road is not desired. This position is indicated by the solid lines. Metal pieces 4 are set into or incorporated with anti-skid tread 3 and project from the surface of the tread thereby furnishing points for traction against the road. Attached to the lower end of anti-skid tread 3 is connecting piece 5, composed of flexible wire rope or other material of suitable strength. Connecting piece 5 is passed through a groove 6 made in the tread portion of tire 1. Groove 6 may be in the form of a valley cut in the normal tread of the tire. The purpose of groove 6 is to provide means for connecting piece 5 to pass around the tire 1 in such a manner that it lies below the normal tread of the tire when anti-skid tread 3 is being carried at the side of the tire and not being used to furnish traction, thus allowing the tire to run as usual on all-rubber tread at these times. Connecting piece 5 after passing through groove 6 is brought around the outer side of tire 1 and connected to rotating shaft 7, the rotation of which causes connecting piece 5 to be wound upon rotating shaft 7, thus drawing anti-skid tread 3 over normal tread of tire 1. The latter position is indicated by dotted lines in Figure 1. Rotating shaft 7 is housed in a metal casing 8 designed with an attached extension piece 9 which is inserted through the conventional opening 10 made in automobile wheels for the application of conventional strap-around chains. Metal casing 8 and extension piece 9 are held in position on the outer side of the wheel by means of removable screws 11, 12, 13, 14. A squared end 15 of rotating shaft 7 allows the shaft to be rotated by means of a tool in the nature of a ratchet wrench which is designed to fit the squared end 15. A slotted metal piece, not shown in Figure 1 but shown in detail in Figure 2, fits squared end 15 of rotating shaft 7 locking the shaft and preventing it from rotating after the anti-skid tread 3 has been brought into any desired position. Connecting piece 16, made of wire rope or other material of suitable strength, is attached to rotating shaft 7 in such manner that upon rotation of rotating shaft 7 the movement of connecting piece 16 will be equal to but in the opposite direction from the movement of connecting piece 5. Connecting piece 16 is led through extension piece 9 of case 8 and is attached to the upper end of anti-skid tread 3.

Figure 2:
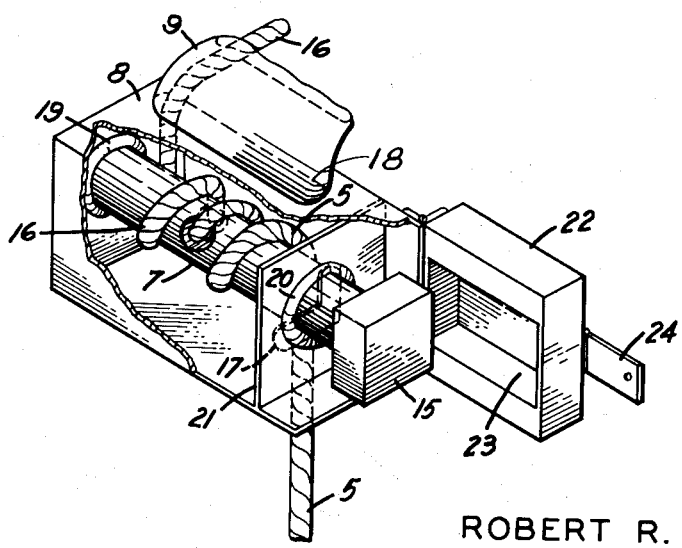
Figure 2 shows in detail the rotating shaft mechanism of the device which actuates the movement of the anti-skid portion of the device from its position at the side of the tire to its position over the normal tread of the tire.

Reference is now made to Figure 2 of the accompanying drawing. Figure 2 shows in detail rotating shaft 7 previously described, the attachment of connecting pieces 5 and 16 thereto and slotted piece 22 which engages squared end 15 of rotating shaft 7 thereby locking rotating shaft 7 in position. Where components described in Figure 1 are shown in detail in Figure 2 the same reference number is used to indicate these components in both drawings. Connecting piece 5 enters housing 8 through opening 17, is wrapped around rotating shaft 7 and affixed thereto. Connecting piece 16 enters housing 8 through the aperture 18 of extension piece 9, see Figure 1, and is likewise wrapped around rotating shaft 7 and affixed thereto. Rotating shaft 7 is supported in housing 8 by a bearing 19 and another bearing 20 located in cross plate 21. Squared end 15 of rotating shaft 7 projects beyond cross plate 21. Before an operating tool in the nature of a ratchet wrench is applied to squared end 15 in order to turn rotating shaft 7 it is necessary to open hinged and slotted piece 22 to the position shown in Figure 2. In the closed position slot 23 engages squared end 15 thus holding rotating shaft 7 in position. In this manner the anti-skid tread is held in any desired position on the tire. In closed position slotted piece 22 is held to housing 8 by means of clasp device 24.

In general practice four anti-skid and traction devices of the type described would be installed on each rear wheel of a vehicle, one for each of the four openings made in conventional automobile wheels for the use of conventional strap-around chains. The number of anti-skid treads put into use at any time would be at the discretion of the vehicle operator. By simply applying the operating tool to rotating shaft 7, anti-skid tread 3 is brought over the normal tire tread and locked into position by slotted piece 22 as described. A similar procedure is followed when it is desired to remove anti-skid tread 3 to the side of the tire and thus permit the tire to run on its normal tread only.

The following claims are made in connection with the device herein described.

I claim:

1. In combination with a rim mounted tire having a transverse opening through the rim and a transverse groove through the tread portion of the tire, a traction device comprising a housing having an extension mounted in a transverse opening of the rim and secured therein, a winding shaft mounted for rotation in said housing, a cable wound on said winding shaft for winding movement thereon, one free end of said cable extending through said housing extension, the second free end of said cable extending through said housing in an opposite direction to said first free cable end and disposed in said transverse tire groove, a traction element attached to the free ends of said cable and forming a continuous loop with said cable, means for rotating said winding shaft to wind said cable and to move said traction element in one direction to dispose said traction element over the tread of the tire and in the reverse direction to dispose said traction element along the sidewall of the tire, and means for locking said shaft in a selected position.

2. The structure defined in claim 1 in which said winding shaft is provided with a non-circular wrench engaging end portion.

3. The structure of claim 2 in which said locking means comprise a closure hinged to an end wall of said housing, said closure when in closed position engaging the end portion of the winding shaft to prevent rotation thereof.

4. For use on a rim supported tire having an open transverse groove in its tread, a traction device comprising an endless cable having traction elements on a portion thereof, said cable spanning said tire and rim, and means for winding said cable whereby said traction elements are selectively disposed over the tire tread and to the side of the tire casing, said cable being seated in said transverse tread groove in the non-traction position of the assembly.

5. For use with a tire rim having at least one transverse opening therethrough and a tire having at least one transverse open groove in its tread, a traction device comprising a cable inserted through said rim opening and having traction elements between its free ends, and winding means for said cable mounted on said rim, said winding means adapted to selectively move said cable and traction elements over and away from said tire tread.

References Cited in the file of this patent

UNITED STATES PATENTS

| | | |
|---|---|---|
| 1,403,270 | Small | Jan. 10, 1922 |
| 1,410,906 | Forrest | Mar. 28, 1922 |
| 2,529,427 | Snedeker | Nov. 7, 1950 |
| 2,561,910 | Coffey | July 24, 1951 |